United States Patent
Cui et al.

(10) Patent No.: US 11,201,796 B2
(45) Date of Patent: Dec. 14, 2021

(54) ENABLING TRANSFER OF WIDGETS ACROSS CONTAINERS AT RUNTIME

(71) Applicant: International Business Machines Corporation, Armonk, NY (US)

(72) Inventors: Jie Cui, Beijing (CN); Richard D. Thompson, Trumbull, CT (US); Yuan Wang, Beijing (CN); Jing Min Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/744,603

(22) Filed: Jan. 16, 2020

(65) Prior Publication Data

US 2020/0153704 A1    May 14, 2020

Related U.S. Application Data

(63) Continuation of application No. 16/033,444, filed on Jul. 12, 2018, now Pat. No. 10,581,698, which is a
(Continued)

(30) Foreign Application Priority Data

Apr. 23, 2012    (CN) .......................... 201210120954.7

(51) Int. Cl.
   *G06F 3/048*    (2013.01)
   *H04L 12/24*    (2006.01)
   *G06F 9/455*    (2018.01)

(52) U.S. Cl.
   CPC .......... *H04L 41/22* (2013.01); *G06F 9/45529* (2013.01)

(58) Field of Classification Search
   CPC .......... G06F 21/62; G06F 21/10; G06F 21/00; G06F 9/45529; H04L 12/24; H04L 41/22
   See application file for complete search history.

(56) References Cited

U.S. PATENT DOCUMENTS

| | | |
|---|---|---|
| 7,934,162 B2 | 4/2011 | Wong et al. |
| 8,271,427 B1 | 9/2012 | Schwartz' et al. |

(Continued)

FOREIGN PATENT DOCUMENTS

| | | |
|---|---|---|
| CN | 101855618 A | 10/2010 |
| CN | 102016796 A | 4/2011 |

(Continued)

OTHER PUBLICATIONS

Faure et al., "Power Tools for Copying and Moving: Useful Stuff for Your Desktop", Proceedings of the 27th International Conference n Human Factors in Computing Systems, ACM, Apr. 3-9, 2009.

(Continued)

*Primary Examiner* — Rashawn N Tillery
(74) *Attorney, Agent, or Firm* — Scully, Scott, Murphy & Presser, PC; Joseph Petrokaitis, Esq.

(57) ABSTRACT

A method and system for enabling transfer of widgets across containers at runtime. According to embodiments of the present invention, a user is allowed to transfer a widget across containers at runtime, for example, moving a widget that has been deployed and operated in one widget container to another, even though the destination widget container originally does not support the widget. Specifically, the widget being transferred can keep consistency in terms of data and state before and after the transfer. Furthermore, the user can implement the cross-container transfer of widgets at runtime by, for example, convenient interaction means like a drag-and-drop operation. In this way, the user can operate and interact with Web applications in a more convenient and flexible way.

8 Claims, 7 Drawing Sheets

Related U.S. Application Data continuation of application No. 13/867,385, filed on Apr. 22, 2013, now Pat. No. 10,050,845.

(56) References Cited

U.S. PATENT DOCUMENTS

| | | |
|---|---|---|
| 8,789,068 B2 | 7/2014 | Russell |
| 2006/0179079 A1 | 8/2006 | Kolehmainen |
| 2007/0130541 A1* | 6/2007 | Louch ................. G06F 3/04817 715/804 |
| 2008/0048974 A1 | 2/2008 | Leibow |
| 2008/0168106 A1 | 7/2008 | Freedman |
| 2008/0168391 A1 | 7/2008 | Robbin et al. |
| 2009/0055758 A1 | 2/2009 | Sim et al. |
| 2009/0228824 A1 | 9/2009 | Forstall et al. |
| 2009/0249359 A1 | 10/2009 | Caunter et al. |
| 2009/0265644 A1* | 10/2009 | Tweed ................ G06F 3/04886 715/762 |
| 2010/0070886 A1 | 3/2010 | Poulsen et al. |
| 2010/0153865 A1* | 6/2010 | Barnes .................... H04L 67/10 715/762 |
| 2010/0162151 A1* | 6/2010 | Class .................... G06F 3/0484 715/765 |
| 2011/0060994 A1 | 3/2011 | Maxwell et al. |
| 2011/0119609 A1* | 5/2011 | Bhatt .................... G06F 3/0481 715/765 |
| 2011/0289428 A1 | 11/2011 | Yuen et al. |
| 2013/0132809 A1* | 5/2013 | Tseng .................. G06F 16/9535 715/205 |
| 2013/0167080 A1* | 6/2013 | Ari ........................ G06F 3/0481 715/801 |
| 2014/0200743 A1* | 7/2014 | Kwon ..................... H04L 63/08 701/2 |

FOREIGN PATENT DOCUMENTS

| | | |
|---|---|---|
| CN | 102214101 A | 10/2011 |
| CN | 102331898 A | 1/2012 |
| WO | WO2011128501 A1 | 10/2011 |

OTHER PUBLICATIONS

Lutteroth et al., "Tuple Space for Mashups", Computer Science Technical Reports (2011-002), 2011, University of Auckland Computer Science Department, New Zealand, 1173-3500, Jan. 2011.

* cited by examiner

ENABLING TRANSFER OF WIDGETS ACROSS CONTAINERS AT RUNTIME

CROSS-REFERENCE TO RELATED APPLICATIONS

This application is a continuation of copending U.S. patent application Ser. No. 16/033,444, filed Jul. 12, 2018, which is a continuation of U.S. patent application Ser. No. 13/867,385, filed Apr. 22, 2013. The entire contents and disclosures of U.S. patent application Ser. Nos. 16/033,444 and 13/867,385, are hereby incorporated herein by reference.

This application claims priority under 35 U.S.C. § 119 from Chinese Patent Application No. 201210120954.7 filed Apr. 23, 2012, the entire contents of which are incorporated herein by reference.

TECHNICAL FIELD

Embodiments of the present invention generally relate to Web technology, and more specifically, to a method and system for enabling transfer of widgets across containers at runtime.

BACKGROUND OF THE INVENTION

With the continuous development of Web technology, widgets have been increasingly widely used in Web application. The term "widget" as used here refers to an independent small application that can be embedded into a third party Web interface by a user or a process in case of authorization. The "Web interface" as used here includes but is not limited to the Web page or any user interface of Web-based application.

Widgets allow users to add personalized and/or customizable dynamic contents to a Web page or a Web application. As an example, a user can add widget "weather forecast" related to weather information to the Web interface so as to access from a corresponding weather information provider the data related to the weather condition and dynamically display the data on the Web interface. A widget is usually implemented by Web technology such as JavaScript, Flash, HTML, CSS, etc., and can perform various operations based on API provided by a Web browser or a widget container. Generally speaking, a widget includes components such as a definition file and resource files. The definition file of the widget is, for example, an Extensible Markup Language (XML) document, which describes the attribute, event and view, etc. of the widget. The resource files, for example, can include a JS document, a Cascading Style Sheet (CSS) document, etc.

On a Web interface, widgets are generally managed by "container." The "container" provides functionality for rendering and managing widgets and associated classes e.g. JavaScript class. For example, a widget container can manage a set of widgets in a Web interface, parse the definition of each widget and create a corresponding encapsulation to render the widget in the Web interface. The widget container can also manage the lifecycle of the widget and process shared objects. Considering a Web browser application as an example, each Web page displayed by the Web browser application can be associated with a widget container, and the widget container is used to manage and control the widgets residing in the page displayed by the instance or tag. In this document, the management and control of widgets by the widget container can be referred as "hosting."

In operation, the user usually wants to move the rendered widgets within the user interface at runtime. The term "runtime" used herein refers to the state in which widgets have been put into use after being developed, e.g. after having been deployed and rendered. For example, a common means for implementing such a movement of widgets at runtime is a Drag-and-Drop (DnD) operation. The user, for example, can use a pointing device like a mouse to select a widget to be moved e.g. by pressing the left key of the mouse. Then the user can use the pointing device to drag the selected widget e.g. by transferring the cursor of the mouse while keeping the left key of the mouse pressed, until a target position is reached. In response to an indication of a drag-and-drop completion e.g. by releasing the left key of the mouse, the widget is moved to the target position.

However, currently, the movement or transfer of a widget at runtime only can be executed in the same container, and cannot be executed across containers. Still considering the Web browser application as an example, as described above, one instance or tag of Web browser application is generally associated with one widget container. In the prior art, it is impossible for a user to transfer a deployed and rendered widget in one instance of the Web browser application to another instance.

It can be understood that the developer of the widget can deploy a widget in different containers during the development by, for example, copying widget codes between different containers and applications. However, such a manner is not adapted to the end user because the end user cannot obtain the source code of a widget. In other words, in the prior art, the transfer of a widget between different container only can be implemented by the developer during the period of development and/or maintenance, while the end user cannot transfer a widget between different containers in an interactive manner at runtime.

The above problem brings inconvenience to the use and operation of the user. For example, the user can add a "weather forecast" widget to the page displayed by a Web browser instance, and conduct a specific personalized setting. In this case, if the user hopes to use the same widget in the page displayed by another Web browser instance, the user must perform the entire adding and setting process again and cannot reuse the deployed and set widget by transferring it.

SUMMARY OF THE INVENTION

In view of the above problem existing in the prior art, a solution is needed in the art to enable transferring of widgets across widget containers at runtime. Therefore, embodiments of the present invention provide a method and system for controlling a widget during transfer at runtime.

According to the first aspect of the present invention, there is provided a method of controlling a widget at runtime, the widget being hosted by a first widget container. The method includes: detecting an indication of transferring the widget to a second widget container at the first widget container, which is different from the first widget container at runtime; and transferring the widget to the second widget container in response to the detection of the indication so that the widget becomes hosted by the second widget container at runtime.

According to the second aspect of the present invention, there is provided a method of controlling a widget at runtime, the widget being hosted by a first widget container. The method includes: detecting an indication of transferring the widget at a second widget container different from the first widget container, to the second widget container at runtime; and receiving the widget from the first widget container in response to the detection of the indication, thereby hosting the widget by the second widget container at runtime.

According to the third aspect of the present invention, there is provided a system for controlling a widget at runtime, the widget being hosted by a first widget container. The system includes: first indication detecting means configured to detect an indication of transferring the widget at the first widget container to a second widget container different from the first widget container at runtime; and widget transferring means configured to transfer the widget to the second widget container in response to the detection of the indication so that the widget becomes hosted by the second widget container at runtime.

According to the fourth aspect of the present invention, there is provided a system for controlling a widget at runtime, the widget being hosted by a first widget container. The system includes: second indication detecting means configured to detect an indication of transferring the widget to a second widget container at runtime at a second widget container different from the first widget container; and widget hosting means configured to receive the widget from the first widget container in response to the indication, to host the widget by the second widget container at runtime.

BRIEF DESCRIPTION OF THE DRAWINGS

Through reading the following detailed description with reference to the accompanying drawings, the above and other objectives, features and advantages of embodiments of the present invention will become more comprehensible. In the drawings, a plurality of embodiments of the present invention are illustrated in an exemplary and non-limiting manner, wherein.

DETAILED DESCRIPTION OF THE PREFERRED EMBODIMENTS

Figure 1:
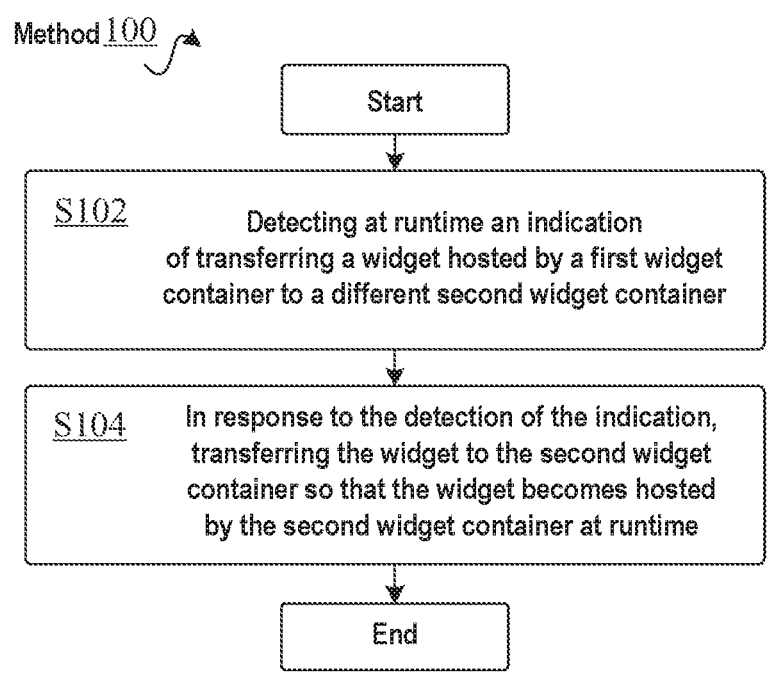
FIG. 1 illustrates a schematic flow chart of a method 100 of transferring a widget currently hosted by a first widget container at the first widget container to a second widget container at runtime according to an exemplary embodiment of the present invention.

Hereinafter, the principle and spirit of the present invention will be described with reference to a plurality of exemplary embodiments illustrated in the drawings. It should be understood that these embodiments are provided only to enable those skilled in the art to better understand and further implement the thinking of the present invention, rather than limiting the scope of the present invention in any way.

Reference is first made to FIG. 1, where a flow chart of a method 100 of transferring, at the first widget container, a widget currently hosted by a first widget container to a second widget container according to an exemplary embodiment of the present invention is illustrated. It should be noted that the method 100, for example, can be performed by the first widget container where the widget is currently hosted, or by its associated party/process.

After the method 100 starts, at step S102, an indication of transferring a widget currently hosted by a first widget container to a second widget container different from the first widget container is detected at the first widget container at runtime.

According to embodiments of the present invention, the widget can be any application that is currently known developed in the future and can be deployed and rendered on Web interface e.g. Web page for presenting data and/or interaction with users. The widget can be developed by employing any appropriate language and Web technology. The scope of the present invention is not limited in these regards.

Prior to executing the step S102, the widget is hosted by the first widget container. The term "hosting" used here refers to managing and controlling operations on the widget in respective phases such as creating, setting, rendering, interacting, destroying, etc. According to embodiments of the present invention, the container responsible for hosting the widget can reside in the Web application client e.g. Web browser side and can also reside in the server side where Web service is provided. One Web interface or Web application is, for example, associated with one widget container, and each widget container can, for example, host one or more widgets.

Specifically, according to embodiments of the present invention, the indication detected at step S102 is a runtime indication. In other words, such an indication is provided by an end user in operation after the widget is deployed and rendered. This substantively differs from the situation where the developer controls a widget by accessing and amending the source code during the period of development and/or maintenance.

At step S102, the runtime indication of transferring a widget from a first widget container to a second widget container, for example, can be a cross-container drag operation directed to the widget. As an example, a user can click a widget within the first container by a pointing device as a mouse, and start the drag operation while keeping the left key pressed. Once the cursor of the pointing device moves out of the scope of the current widget container, a cross-container transfer of the widget occurs. As known to those skilled in the art, in Web applications, the drag operation is a commonly-used operation. In embodiments of the present invention, the compatibility with the existing Web application and widget can be implemented by using a drag event as a trigger for widget transfer across containers. Furthermore, in such embodiments, the steps of the method 100 can be executed by a handler responsible for the drag event, which will be detailed below.

It should be noted that it is only exemplary to take the drag event as the trigger event for widget transfer across containers. Alternatively or additionally, for example, various controls e.g. drop-down list, check box, text entry box, etc., can be provided on the Web interface for a user to select a widget to be transferred and a destination container. Other implementation manners are also possible, and the scope of the present invention is not limited in this regard.

As the destination of the transferring operation, the second widget container is another widget container different from the first widget container. For example, the first and second container can be associated with different instances of Web browser application (the same type or different types), or different tags of a Web browser application instance.

Next, the method 100 proceeds to step S104, where in response to the indication detected at step S102, the widget is transferred from the first widget container to the second widget container such that the widget becomes hosted by the second widget container at runtime. In other words, by executing step S104, the widget previously rendered and operated in the first widget container is added to the second widget container, and various operations such as rendering, setting and interaction on the widget are controlled and managed by the second widget container.

At step S104, in order to change the hosting party of the widget from the first widget container to the second widget container at runtime, a simple and feasible manner is to deliver the HTML code of the widget from the first widget container to the second widget container at runtime. As an example, the HTML code can be delivered among widget containers at runtime based on the fifth edition of Hypertext Markup Language (HTML5). Specifically speaking, there exists in HTML 5 an object called DataTransfer and a corresponding method call, which can be used to delivery data across containers e.g. across browsers.

In the prior art, it is impossible for a end user to transfer a widget across containers at runtime, because the information e.g. code, definition, etc. of the widget is managed and maintained by a widget container hosting the widget, while the prior art does not support delivering such information of the widget across containers. According to embodiments of the present invention, this problem is overcome and solved by means of cross-container data delivery mechanism at runtime such as HTML 5.

It would be appreciated that according to embodiments of the present invention, a user is allowed to transfer widgets across containers at runtime, for example, transferring a widget that has been deployed and operated in one widget container to another widget container even though the destination widget container originally does not support the widget. Considering from an angle of application, the user can, for example, transferring a widget from one Web interface to another Web interface via a drag-and-drop operation. Specifically, according to some embodiments of the present invention, the widget being transferred at runtime can keep consistency in terms of data and state in different widget containers before and after the transfer. By this manner, compared with the prior art, embodiments of the present invention can provide greater convenience and flexibility for the widget operation of Web application.

It should be noted that the implementation based on HTML 5 is merely exemplary, and any technical means that is currently known developed in the future and supports delivering data across containers or browsers can be used in combination with embodiments of the present invention. For example, it will be envisaged that respective subsequent editions of the HTML language following HTML 5 will also have similar functions and thus can also be used to practice the present invention.

Further, in optional embodiments of the present invention, additional and/or alternative information related to the widget can be delivered from the first widget container to the second widget container. For example, the detailed definition of the widget including deploy information and script definition event, etc., and the state and real-time data of the widget when being transferred can be delivered from the first widget container to the second widget container. This will be detailed below with reference to FIG. 2.

The method 100 ends after step S104.

By performing the method 100, a user is allowed to transfer a widget across containers. Considering from the aspect of application, a widget can be transferred across instances of Web page, Web applications, and Web browsers and/or tags of a Web browser. It should be especially noted that each step of the method 100 can be executed in real time at runtime.

Considering a specific example, a user logs into a financial website and adds and configures a widget related to stocks in the web page. When the user logs into another website primarily relating to technology, he can want to embed a widget related to stocks on the page of the website so as to check in real time the trend of the stock price of high technology corporations that he/she is interested in. At this point, by using the prior art, the user has to add and configure the stock widget again on the page of the technology website. Furthermore, if the technology website does not support the stock widget, the user cannot implement his intention at all. However, with embodiments of the present invention, the user can drag and drop a widget across web pages, i.e., from a financial web page to a technology web page at runtime, and the widget still can operate normally.

Figure 2:
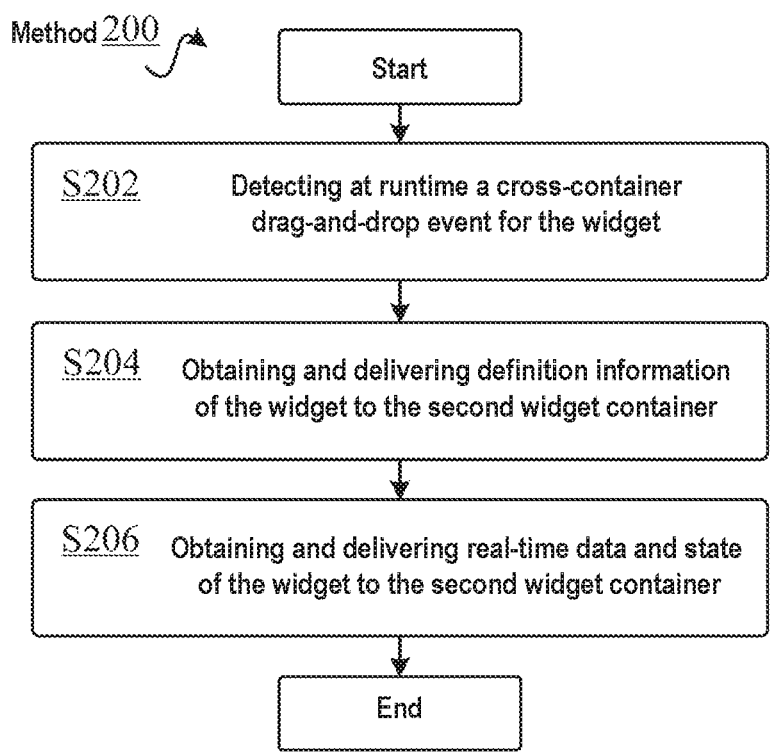
FIG. 2 illustrates a schematic flow chart of a method 200 of transferring a widget currently hosted by a first widget container at the first widget container to a second widget container at runtime according to another exemplary embodiment of the present invention.

Now referring to FIG. 2, a flow chart of a method 200 of transferring, at the first widget container, a widget currently hosted by a first widget container to a second widget container at runtime is illustrated according to another exemplary embodiment of the present invention.

The method 200 described in FIG. 2 can be regarded as a specific implementation of the method 100 as above described with reference to FIG. 1. Similar to the method 100, the method 200 can also be performed by the first widget container where the widget is currently hosed, or by its associated party/process.

After the method 200 starts, at step S202, a cross-container drag-and-drop event of transferring a widget from a first widget container to a second widget container is detected at runtime. In other words, at step S202, the cross-container transferring indication of the widget at runtime described above with reference to step S102 in method 100 is implemented as a cross-container drag-and-drop event directed to the widget.

In such an embodiment, the processing required to implement the cross-container transfer of widget, for example, can be implemented by an event handler of the drag-and-drop operation. Such an event handler, for example, can be written by means of script language like JavaScript. This is known to those of ordinary skill in the art and is thus not detailed here.

Next, at step S204, in response to the cross-container drag-and-drop event for the widget, information indicating the definition of the widget is obtained and delivered to the destination second widget container.

It should be understood that the widget is currently hosted by the first widget container, and thus at step S204, the definition information of the widget can be obtained by the first widget container. For example, such definition information can be obtained from a server associated with the first widget container. Alternatively or additionally, such definition information can also be stored locally in a client of the first widget container.

According to embodiments of the present invention, the definition information obtained at step S204 can be a definition file of the widget, and can also be a reference e.g. in a form of Uniform Resource Locator URL to the definition file. The definition file of a widget, generally described by XML, can include any information related to the widget, including but not limited to one or more of the following: the HTML code of the displaying portion, the rendering and deploying information e.g. Cascading Style Sheets CSS, the event that can be transmitted and received, and the code in response to the event e.g. defining by a script language like JavaScript, etc. of the widget. Compared with merely delivering the HTML code of a widget, obtaining and delivering the definition information of the widget can keep the attributes e.g. appearance, event and event response mechanism of the widget more complete after the cross-container transfer.

As an example, at step S204, the definition information relating to the widget and obtained by the first widget container can be delivered to the second widget container based on a data delivery mechanism like HTML5. Of course, any other appropriate data delivery means can be used in combination with embodiments of the present invention, and the scope of the present invention is not limited in this regard.

Next, the method 200 proceeds to step S206, where in response to the indication of transferring the widget across containers, a cross-container drag-and-drop event in this case, the real-time data and state information of the widget to be transferred within the first widget container is obtained and delivered to the second widget container.

According to some embodiments of the present invention, such real-time data and state information can be obtained, for example, by calling an Application Program Interface (API) provided by the first widget container and/or Web browser/application. Alternatively or additionally, some states and data of the widget can also be obtained by parsing an Extensible Markup Language (XML) document associated with the widget. The obtained real-time data and states can also be delivered across containers i.e., from the first widget container to the second widget container, by utilizing, for example, the DataTransfer mechanism in HTML 5.

However, those skilled in the art can understand that some transient data of the widget can not be obtained by calling API or parsing XML. Such data, for example, can include user operation information, editing information, user stored/unsorted state, Asynchronous JavaScript and XML (AJAX) call state, etc. for the widget. In order to solve this problem, the developer of the widget can be allowed to write during the development an interface for storing such transient data and states, e.g. serialization functions. Thus, at step S206, real-time data and states can be obtained and stored by calling corresponding serialization functions defined in the widget. Accordingly, the second widget container can obtain the stored data and states by calling the corresponding de-serialization functions, which will be described in detail hereinafter.

The method 200 ends after step S206.

Compared with the method 100, the method 200 delivers to the second widget container not only the HTML code of the widget but also can deliver the accurate definition including high level information like deployment of the widget at runtime and the real-time data and states at the instant of transfer. With such information, the second widget container can host the widget more effectively. Specifically, the second widget container could not only render a widget but also ensure that various related information of the widget, such as appearance, state, data, attribute, etc. remains consistency as it is at the instant when the widget is transferred in the first widget container.

A user can transfer any given widget that has been deployed and operated in one Web interface to another Web interface e.g. via a drag-and-drop operation, and keep the integrity and consistency of the data and operating state of the widget. In this way, the user does not need to set the widget again in another Web interface. Considering a specific example, if the transferred widget is a gaming widget, the user can transfer the widget across containers during a game, and can keep the process and state of the game after the transfer, and thereby can continue the game.

It should be noted that, similar to the method 100, each step of the method 200 can be executed in real time at runtime.

Figure 3:
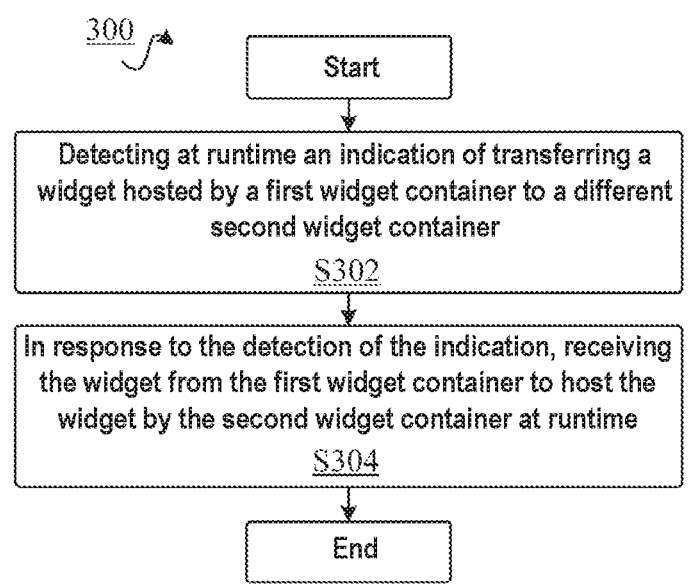
FIG. 3 illustrates a schematic flow chart of a method 300 of receiving, at a second widget container from a first widget container a widget currently hosted by the first widget container at runtime according to an exemplary embodiment of the present invention.

Now referring to FIG. 3, where a flow chart of a method 300 of receiving, at a second widget container, from a first widget container a widget currently hosted by the first widget container at runtime according to an exemplary embodiment of the present invention is illustrated. It is understood that the method 300, for example, can be performed by the second widget container as the destination, or by its associated party/process.

After the method 300 starts, at step S302, runtime an indication of transferring a widget hosted by a first widget container different from a second widget container to the second widget container is detected at runtime. It can be understood that the step S302 corresponds to the step 102 as above described with reference to FIG. 1, and thus the features above described in combination with the step S102 are also adapted here. Specifically, in some exemplary embodiments, the indication at step S302 can be a drag-and-drop event initiated by a user using a pointing device like a mouse.

Next, the method 300 proceeds to step S304, where the widget is received from the first widget container so that the widget becomes hosted by the second widget container at runtime. It can be understood that the step S304 corresponds to the step 104 as above described with reference to FIG. 1, and thus the features above described in combination with the step S104 are also adapted here.

Specifically, in some embodiments of the present invention, at step S304, delivery of data across containers can be implemented by utilizing, for example, the DataTransfer object and mechanism in HTML 5. Of course, other data delivery mechanisms that are currently known developed in the future are also possible, and the scope of the present invention is not limited in this regard.

According to some embodiments of the present invention, at step S304, the second widget container can receive at least the HTML code of the transferred widget, and render the second widget on the Web interface associated with the second widget container. Thereby, the user can browse and operate the widget on the Web interface associated with the second widget container. Besides, the second widget container further can receive the additional and/or alternative information related to the widget from the first widget container, which will be detailed with reference to FIG. 4.

The method 300 ends after step S304.

With the method 300, a user can transfer a widget that has be deployed and operated in the first widget container to the second widget container (e.g. via a drag-and-drop operation) at runtime, even though the service provider of the second widget originally does not support the widget. It should be noted that each step of the method 300 can be executed in real time at runtime.

Figure 4:
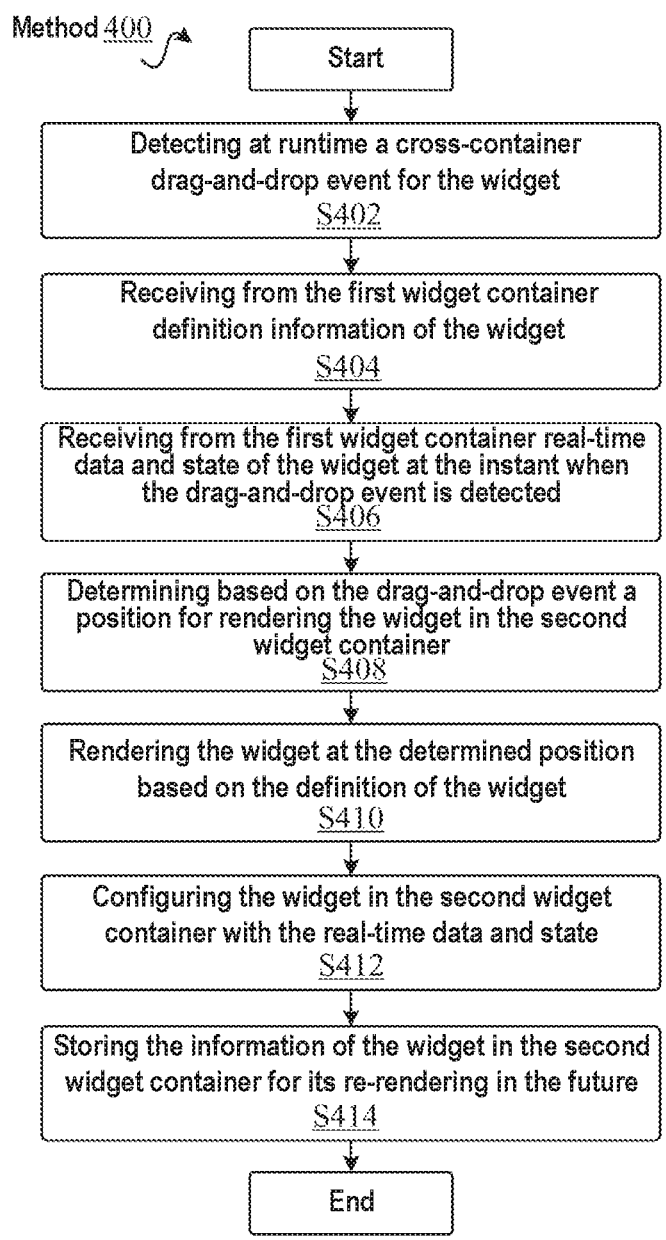
FIG. 4 illustrates a schematic flow chart of a method 400 of receiving, at a second widget container, from a first widget container a widget currently hosted by the first widget container at runtime according to another exemplary embodiment of the present invention.

Now referring to FIG. 4, where a flow chart of a method 400 of receiving at a second widget container, from a first widget container a widget currently hosted by the first widget container at runtime according to another exemplary embodiment of the present invention is illustrated. The method 400 described in FIG. 4 can be regarded as a specific implementation of the method 300 as above described with reference to FIG. 3. Similar to the method 300, the method 400 can also be performed by the second widget container as the destination, or by its associated party/process.

After the method 400 starts, at step S402, an indication of transferring a widget currently hosted by the first widget container to a second widget container is detected at runtime at the second widget container. In the embodiment illustrated in FIG. 4, the runtime indication is implemented as a cross-container drag-and-drop operation for the widget initiated by the user via a pointing device like a mouse. Similarly, as described above, in such an embodiment, the subsequent processing of the widget can be implemented by a drag-and-drop event handler.

Next, the method 400 proceeds to step S404, where information indicating definition of the transferred widget is received from the first widget container. The step S404 corresponds to the step S204 in the method 200. Accordingly, the definition information received at step S404 can be a definition file of the widget or an URL referencing to the definition file. The definition of the widget can include, but not limited to one or more of the following: the HTML code of the widget, the rendering and deploying information e.g. CSS, the event that can be responded and processed, etc. The widget can be transferred across containers more completely by receiving such definition information from the first widget container. According to some embodiments of the present invention, at step S404, the definition information of the widget can be received by utilizing the runtime cross-container data delivery mechanism such as the DataTransfer mechanism of HTML 5.

Next, the method 400 proceeds to step S406 to receive real-time data and state information of the transferred widget at the instant when the transferring indication is detected within the first widget container. The step S406 corresponds to the step S206 in the method 200. Accordingly, some real-time data and states of the widget can be obtained by calling appropriate API or parsing XML by the first widget container. As an example, such real-time data and states of the widget can be received by utilizing the cross-container data delivery mechanism such as HTML 5, etc.

Besides, some other data and states can be stored by the first widget container by calling, for example, serialization functions defined in the widget. Correspondingly, at step S406, the second widget container can obtain the stored real-time data and states by calling the corresponding de-serialization functions. The de-serialization functions in the widget, for example, can be defined and provided by the developer of the widget.

The method 400 then proceeds to step S408, where optionally, the position for rendering the widget in the second widget container can be determined based on the drag-and-drop event functioning as the transferring indication. Specifically, when a user drags a widget via a drag-and-drop operation to the expected position within the second widget container, he/she, for example, can indicate the completion of the drag-and-drop operation by releasing the left key of the mouse. At that time, the position e.g. coordinate information, of the Web interface associated with the second widget container as indicated by the cursor of the mouse can be obtained. Thereafter, any appropriate policy can be employed to determine the position for rendering the widget within the second widget container.

As a feasible solution, a widget can be rendered by force in the position indicated by the cursor, wherein the position of the cursor in the container can be obtained by utilizing the coordinate information associated with a standard HTML event. If the position has other information already presented, the position where the information is presented can be modified to thereby solve the potential conflict of the rendering position. In other words, according to this manner, the existing information in the cursor position is transferred to another position in the second widget container for display, while the transferred widget is rendered in the cursor position in the second widget container.

Figure 8:
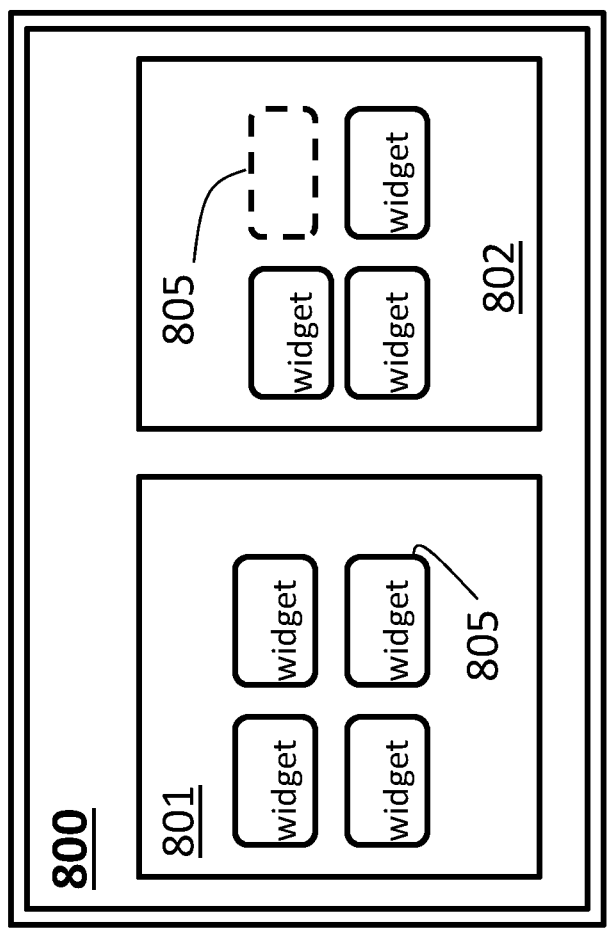
FIG. 8 is a schematic diagram of a display presenting a first widget container and a second widget containers used for containing widgets in embodiments described herein.

As an alternative for solving the potential conflict of the rendering position, an available position closest to the cursor position can be selected to render the transferred widget. For example, FIG. 8 generally depicts a schematic diagram of a display 800 presenting a first widget container 801 and a second widget container 802 used for containing widgets. A widget container generally divides the Web interface associated with the widget container into a plurality of areas called widget boxes 805, each area being used to render a widget. If the widget box 805 where the position indicated by a drag-and-drop operation within the second widget container is located is empty, the transferred widget can be rendered in the box. On the other hand, if the box has been used for rendering another widget, an available empty box closest to the position indicated by the cursor can be selected to render the transferred widget.

The examples described above are only for explanation purpose, any other appropriate mechanism can be used for rendering the transferred widget within the second widget container, for example, a predetermined deployment based on the Web interface, etc.

Next, the method 400 proceeds to step S410, where the widget transferred to the second widget container is rendered at the position determined at step S408 by utilizing the definition information received at step S404. Given the definition information of a widget, the second widget container can render the widget in an indicated position. This is known to those of ordinary skill in the art and is thus not detailed here.

Then, at step S412, the rendered widget is configured in the second widget container with the real-time data and state of the widget received at step S406. In this way, the second widget container not only can render the widget but also can ensure the integrity and consistency of various information of the widget, such as appearance, state, attribute, data, etc.

The method 400 can further perform the optional step S414, where in response to hosting a widget by the second widget container at runtime, the information of the widget in the second widget container is stored for future re-rendering of the widget in the second widget container. It can be understood that in some Web applications, a widget container for use in the Web interface can be managed and controlled by a back-end server. In this case, although the widget is successfully transferred to the second widget container by performing the method 400, once the event such as refreshing occurs, the transferred widget will be lost in the second widget container. In order to avoid this phenomenon, it is beneficial to perform the optional step S414.

Specifically, at step S414, the information of the transferred widget in the second widget container can be stored in the second widget container via the API provided by the second widget container, or stored in any other storage location accessible to the second widget container. The stored information includes but not limited to one or more of the following: itemSet, event wire, any real-time data and state, and interface information associated with the second widget container, etc. of the widget. By storing such information, when an event like refreshing that can cause widget re-rendering occurs in the future in the interface associated with the second widget container, the second widget container can access the previously stored information and re-render the widget transferred to the second widget container in the refreshed interface.

The method 400 ends after step S414.

By performing the method 400, the second widget container can receive and host at runtime the widget originally hosted by the different first widget container, even though the service provider of the second widget container originally does not support the widget. It should be especially noted that, similar to the method 300, each step of the method 400 can be executed in real time at runtime.

The methods 100-400 of transferring and receiving a widget across containers at runtime according to embodiments of the present invention have been described above with reference to FIGS. 1-4. The systems for performing the above methods will be described hereinafter with reference to FIGS. 5 and 6.

Figure 5:
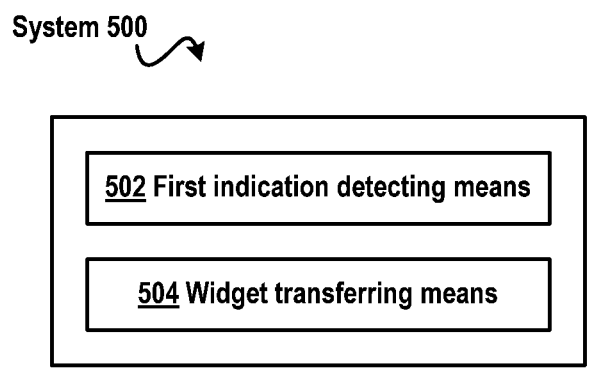
FIG. 5 illustrates a schematic block diagram of a system 500 of transferring, at the first widget container, a widget currently hosted by a first widget container to a second widget container at runtime according to an exemplary embodiment of the present invention.

Reference is made to FIG. 5, where a block diagram of a system 500 of transferring, at the first widget container, a widget currently hosted by a first widget container to a second widget container at runtime according to an exemplary embodiment of the present invention is illustrated.

As illustrated in FIG. 5, according to embodiments of the present invention, a system 500 includes: first indication detecting means 502 configured to detect, at the first widget container, an indication of transferring the widget to a second widget container different from the first widget container at runtime; and widget transferring means 504 configured to transfer, in response to the detection of the indication, the widget to the second widget container so that the widget becomes hosted by the second widget container at runtime.

According to an embodiment of the present invention, the first indication detecting means 502 can include: drag-and-drop event detecting means configured to detect a drag- and drop event for the widget as the indication of transferring the widget to the second widget container.

According to an embodiment of the present invention, the widget transferring means 504 can include: definition obtaining means configured to obtain information indicating a definition of the widget; and definition delivering means configured to deliver the information indicating the definition of the widget from the first widget container to the second widget container.

According to yet another embodiment of the present invention, the widget transferring means 504 can include: state obtaining means configured to obtain, in response to the indication, real-time data and state of the widget in the first widget container; and state delivering means configured to deliver the obtained real-time data and state to the second widget container.

Figure 6:
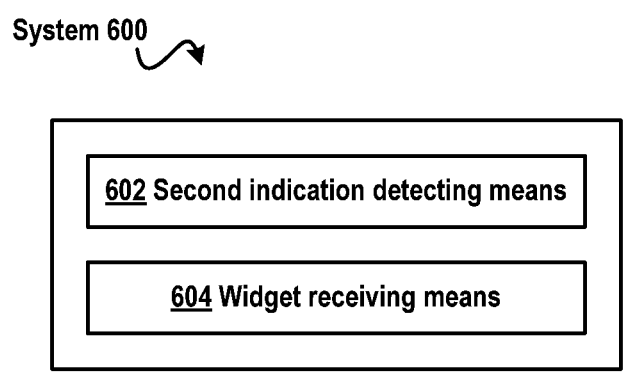
FIG. 6 illustrates a schematic block diagram of a system 600 of receiving, at a second widget container, a widget currently hosted by a first widget container from the first widget container at runtime according to an exemplary embodiment of the present invention.

Referring to FIG. 6, where a block diagram of a system 600 of receiving, at a second widget container, a widget currently hosted by a first widget container from the first widget container at runtime according to an exemplary embodiment of the present invention is illustrated.

As illustrated in FIG. 6, according to embodiment of the present invention, a system 600 includes: second indication detecting means 602 configured to detect, at the second widget container different from the first widget container, an indication of transferring the widget to the second widget container at runtime; and widget hosting means 604 configured to receive, in response to the indication, the widget from the first widget container to host the widget by the second widget container at runtime.

According to an embodiment of the present invention, the second indication detecting means 602 can include: drag-and-drop event detecting means configured to detect at the second widget container a drag- and drop event for the widget as the indication of transferring the widget to the second widget container.

In an embodiment of the present invention, the widget hosting means 604 can include: definition receiving means configured to receive from the first widget container information indicating a definition of the widget; and widget rendering means configured to render the widget in the second widget container based on the definition of the widget.

In an embodiment of the present invention, the widget hosting means 604 can include: state receiving means configured to receive from the first widget container real-time data and state of the widget in the first widget container at the instant when the indication is detected; and widget configuring means configured to configure the widget in the second widget container with the received real-time data and state.

In another embodiment of the present invention, the system 600 can further include: position determining means (not shown) configured to determine based on the indication a position for rendering the widget in the second widget container.

In yet another embodiment of the present invention, the system 600 can further include: state storing means which is not shown, configured to store information of the widget in the second widget container in response to rendering the widget by the second widget container at runtime, for use in re-rendering the widget in the second widget container.

It should be understood that the respective means and the alternative sub-means included by the system 500 and system 600 described above with reference to FIG. 5 and FIG. 6 respectively correspond to the respective steps in the methods 100 and 200 described above with reference to FIGS. 1-2 and in the methods 300 and 400 described above with reference to FIGS. 3-4. Accordingly, all features and operations described above based on the methods 100-400 are respectively adapted to the systems 500 and 600, and thus are not detailed here.

Specifically, the division of the means and alternative sub-means in the systems 500 and 600 is not limited but exemplary. For example, the function of single means as shown in FIG. 5 and FIG. 6 can be implemented by multiple means. On the contrary, the multiple means as shown in FIG. 5 and FIG. 6 can also be implemented by single means. The scope of the present invention is not limited in this regard.

It should also be understood that respective means and sub-means included by the systems 500 and 600 can be implemented in various manners, including software, hardware, firmware, or arbitrary combination thereof. For example, in some embodiments, respective means of the systems 500 and 600 can be implemented using software and/or firmware modules. Alternatively or additionally, respective means of the systems 500 and 600 can also be implemented using hardware modules. For example, respective means of the systems 500 and 600 can be implemented as an integrated circuit (IC) chip or application specific integrated circuit (ASIC). Respective means of the systems 500 and 600 can also be implemented as a system-on-a-Chip (SOC). Other manners that are currently known developed in the future are also possible, and the scope of the present invention is not limited in this regard.

Figure 7:
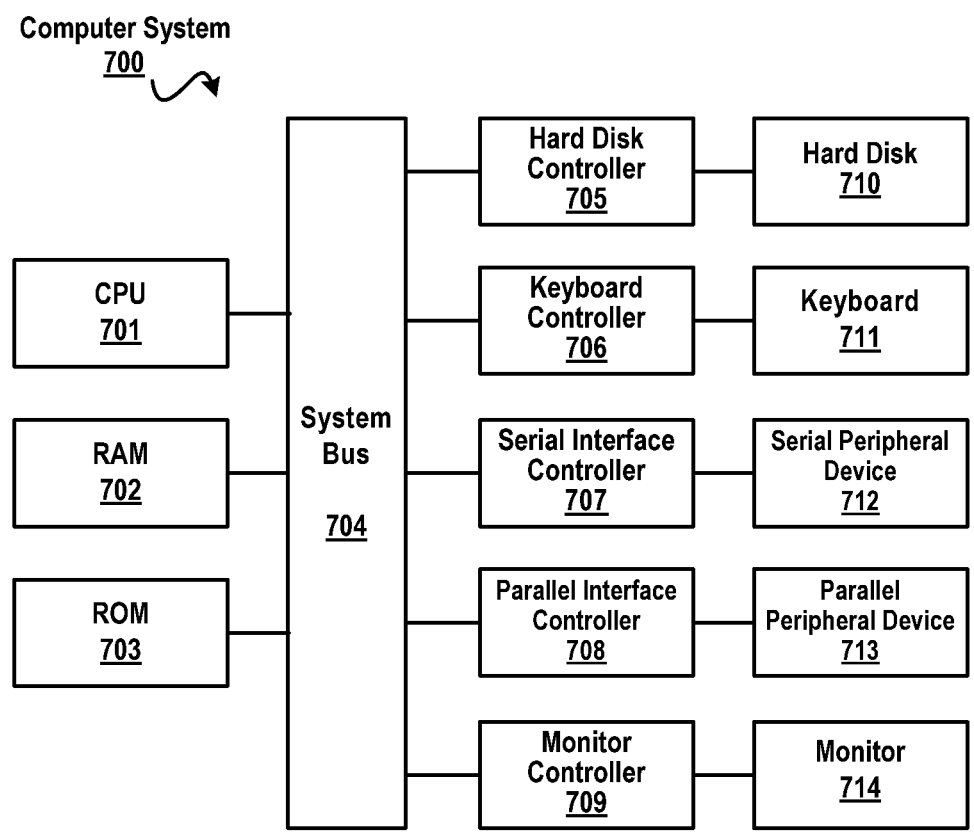
FIG. 7 illustrates a schematic block diagram of an exemplary computer system 700 that is adapted to implement embodiments of the present invention.

Referring to FIG. 7, where a schematic block diagram of a computer system 700 that is adapted to implement embodiments of the present invention is illustrated. As illustrated in FIG. 7, the computer system includes: a CPU (Central Processing Unit) 701, a RAM (Random Access Memory) 702, a ROM (Read Only Memory) 703, a system bus 704, a hard disk controller 705, a keyboard controller 706, a serial interface controller 707, a parallel interface controller 708, a monitor controller 709, a hard disk 710, a keyboard 711, a serial peripheral device 712, a parallel peripheral device 713 and a monitor 714. Among these components, what coupled to the system bus 704 are the CPU 701, the RAM 702, the ROM 703, the hard disk controller 705, the keyboard controller 706, the serial interface controller 707, the parallel interface controller 708 and the monitor controller 709. The hard disk 710 is coupled to the hard disk controller 705; the keyboard 711 is coupled to the keyboard controller 706; the serial peripheral device 712 is coupled to the serial interface controller 707; the parallel peripheral device 713 is coupled to the parallel interface controller 708; and the monitor 714 is coupled to the monitor controller 709. It should be understood that the structural block diagram in FIG. 7 is shown only for illustration purpose, and is not intended to limit the scope of the present invention. In some cases, some devices can be added or reduced as required.

It is known to those skilled in the art that the present invention can be implemented as a system, a method or a computer program product. Thus, the present invention can be specifically implemented in the following forms, i.e. complete hardware, complete software including firmware, resident software, micro-code, etc. or a combination of hardware and software, and they are generally called as "circuit," "module" or "system" in the text. Besides, in some embodiments, the present invention can also be implemented in a form of a computer program product in one or more computer computer-readable media, and the computer computer-readable media include computer-readable program codes.

One or more arbitrary combinations of computer-readable media can be employed. The computer-readable medium can be a computer-readable signal medium or a computer-readable storage medium. The computer-readable storage medium, for example, can be, but not limited to, an electric, magnetic, optical, electromagnetic, infrared, or semiconductor system, apparatus or device, or arbitrary combination thereof. More specific examples rather than an exhaustive list of the computer-readable storage medium include: an electrical connection having one or more wires, a portable computer diskette, a hard disk, a random access memory (RAM), a read-only memory (ROM), an erasable programmable read-only memory (EPROM), an optical fiber, a portable compact disc read-only memory (CR-ROM), an optical storage device, a magnetic storage device, or any appropriate combination thereof. In this text, the computer-readable storage medium can be any tangible medium including or storing a program, and the program can be used by or in combination with an instruction execution system, apparatus or device.

The computer-readable signal medium can include a data signal propagated in a base band or as part of a carrier, wherein a computer-readable program code is carried. Such a propagated data signal can employ various forms, including but not limited to an electromagnetic signal, an optical signal, or any appropriate combination thereof. The computer-readable signal medium can further be any computer-readable medium besides the computer-readable storage medium, and the computer-readable medium can transmit, propagate, or transport the program for use by or in connection with an instruction execution system, apparatus, or device.

The program codes included in the computer-readable medium can be transported by any appropriate medium including, but not limited to, radio, wire, optical cable, RF, etc., or any appropriate combination thereof.

One or more program design languages or a combination thereof can be used to write a computer program code for executing operations of the present invention, and the program design languages include an object-oriented program design language such as Java, Smalltalk, C++, and further include a conventional procedural program design language such as "C" language or a similar program design language. The program code can be executed completely on a user computer, partially on a user computer, as an independent software package, partially on a user computer while partially on a remote computer, or completely on a remote computer or a server. In a case relating to a remote computer, the remote computer can be connected to a user computer via any type of network including a local area network (LAN) or a wide area network (WAN), or can be connected to an external computer (e.g. connected via internet by an internet service provider).

In addition, it should be understood that each block in the flow charts and/or block diagrams and a combination of blocks in the flow charts and/or block diagrams can be implemented by computer program instructions. These computer program instructions can be provided to a processor of a general-purpose computer, a special-purpose computer or other programmable data processing device to generate a machine, and these computer program instructions are executed by a computer or other programmable data processing device to generate a device for implementing the functions/operations prescribed in the blocks in the flow charts and/or block diagrams.

These computer program instructions can also be stored in a computer-readable medium that enables a computer or other programmable data processing device to operate in specific manner, and thus the instructions stored in the computer-readable medium generate a manufacture including the instruction means that implements the functions/operations prescribed in the blocks in the flow charts and/or block diagrams.

The computer program instructions can also be loaded on a computer, other programmable data processing device, or other devices so that a series of operation steps are executed on the computer, other programmable data processing device, or other devices to generate a process implemented by the computer so that the instructions executed on the computer or other programmable device can provide a process for implementing the functions/operations prescribed in the blocks in the flow charts and/or block diagrams.

Furthermore, the flow charts and block diagrams in the accompanying drawings display the system architecture, function and operation that can be implemented by the system, method and computer program product according to embodiments of the present invention. In this point, each block in the flow charts or block diagrams can represent a module, a program segment, or a part of code, which contains one or more executable instructions for performing specified logic functions. It should be further noted that, in some alternative implementations, the functions noted in the blocks can also occur in a sequence different from what is noted in the drawings. For example, two blocks shown consecutively can be performed in parallel substantially or in an inverse order, which depends on the functions involved. It should also be noted that each block in the block diagrams and/or flow charts and a combination of blocks in block diagrams and/or flow charts can be implemented by a dedicated hardware-based system for executing a prescribed function or operation or can be implemented by a combination of dedicated hardware and computer instructions.

Embodiments of the present invention have been described above. The above explanations are exemplary rather than exhaustive, and are not limited to the disclosed embodiments. Many modifications and changes are obvious for those of ordinary skill in the art without departure from the scope and spirit of the illustrated embodiments. The selection of the terms used in this text aims to best explain the principles and actual applications of the embodiments or their technical improvements to the technology in the market, or to enable other ordinary skill in the art to understand respective embodiments disclosed in this document.

What is claimed is:

1. A method comprising:
   hosting a widget in a first widget container of a computer system;
   detecting an indication of transferring the widget to a second widget container of the computer system at runtime of the computer system;
   in response to the detection of the indication, transferring the widget to the second widget container so that the widget becomes hosted by the second widget container at said runtime, including obtaining real-time data and state of the widget at a specified time during operation of the widget in the first widget container during said runtime, and delivering the obtained real-time data and state to the second widget container; and
   determining a position for rendering the transferred widget in a web interface associated with the second container; and wherein:
   the second container divides the web interface into a plurality of widget boxes for rendering widgets; and
   the determining a position for rendering the transferred widget in a web interface associated with the second container includes using coordinate information associated with the second widget container at the completion of a drag operation used to drag the widget to a position within the web interface associated with the second container to indicate the position to render the widget in the web interface associated with the second container, and when the determined position for rendering the transferred widget is in one of the widget boxes and conflicts with rendering another one of the widgets, rendering the transferred widget in another one of the widget boxes, wherein the rendering the transferred widget in another one of the widget boxes includes selecting an empty one of said widget boxes closest to the determined position for rendering the transferred widget.

2. The method according to claim 1, wherein the determining a position for rendering the widget in the web interface associated with the second container includes receiving input from a user for determining the position for rendering the widget in the web interface associated with the second container.

3. The method according to claim 2, wherein:
   the detecting an indication of transferring the widget to a second widget container of the computer system at runtime of the computer system includes the said user using a drag operation to drag the widget to a position within the web interface associated with the second container; and
   the receiving input from a user of the computer system for determining the position for rendering the widget in the web interface associated with the second container includes using the drag operation to indicate a position to render the widget in the web interface associated with the second container.

4. The method according to claim 3, wherein:
   the user using a drag operation to drag the widget to a position within the web interface associated with the second container includes the user indicating a completion of the drag operation; and
   the using the drag operation to indicate a position to render the widget in the web interface associated with the second container includes using the indication of the completion of the drag operation to indicate the position to render the widget in the second container.

5. A widget control system on a computer system for transferring control of a widget at runtime of the computer system from a first widget container to a second, different widget container on the computer system, the widget control system comprising:
   an indication detecting module for detecting an indication of transferring the widget from the first widget container to the second widget container at the runtime of the computer system; and
   a widget transferring module for transferring the widget from the first widget container to the second widget container in response to the detection of the indication, so that the widget becomes hosted by the second widget container at said runtime, and for determining a position for rendering the transferred widget in a web interface associated with the second container, including obtaining real-time data and state of the widget at a specified time during operation of the widget in the first widget container during said runtime, and delivering the obtained real-time data and state to the second widget container; and wherein:
   the second container divides the web interface into a plurality of widget boxes for rendering widgets; and
   the determining a position for rendering the transferred widget in a web interface associated with the second container includes using coordinate information associated with the second widget container at the completion of a drag operation used to drag the widget to a position within the web interface associated with the second container to indicate the position to render the widget in the web interface associated with the second container, and when the determined position for rendering the transferred widget is in one of the widget boxes and conflicts with rendering another one of the widgets, rendering the transferred widget in another one of the widget boxes, wherein the rendering the transferred widget in another one of the widget boxes includes selecting an empty one of said widget boxes closest to the determined position for rendering the transferred widget at an available widget box located closest to the position of the conflicting widget box.

6. A computer program product for transferring control of a widget in a computer system at runtime, the computer system comprising first and second different widget containers, the computer program product comprising:
a computer readable storage medium having program instructions embodied therewith, the program instructions executable by the computer system to cause the computer system to:
host a widget in a first widget container of a computer system;
detect an indication of transferring the widget to a second widget container of the computer system at runtime of the computer system;
in response to the detection of the indication, transfer the widget to the second widget container so that the widget becomes hosted by the second widget container at said runtime, including obtaining real-time data and state of the widget at a specified time during operation of the widget in the first widget container during said runtime, and delivering the obtained real-time data and state to the second widget container; and
determine a position for rendering the transferred widget in a web interface associated with the second container; and wherein:
the second container divides the web interface into a plurality of widget boxes for rendering widgets; and
the determining a position for rendering the transferred widget in a web interface associated with the second container includes using coordinate information associated with the second widget container at the completion of a drag operation used to drag the widget to a position within the web interface associated with the second container to indicate the position to render the widget in the web interface associated with the second container, and when the determined position for rendering the transferred widget is in one of the widget boxes and conflicts with rendering another one of the widgets, rendering the transferred widget in another one of the widget boxes, wherein the rendering the transferred widget in another one of the widget boxes includes selecting an empty one of said widget boxes closest to the determined position for rendering the transferred widget.

7. The method according to claim 1, wherein said one of the widget boxes is used for rendering the another widget.

8. The method according to claim 1, wherein:
the transferring the widget to the second widget container includes a definition receiving means of the second widget contains receiving from the first widget container information indicating a definition of the widget; and
the determining a position for rendering the transferred widget includes rendering the transferred widget in the second widget container based on the definition of the transferred widget.

* * * * *